C. BETTGER.
CLEVIS.
APPLICATION FILED APR. 30, 1917.
1,340,105. Patented May 11, 1920.
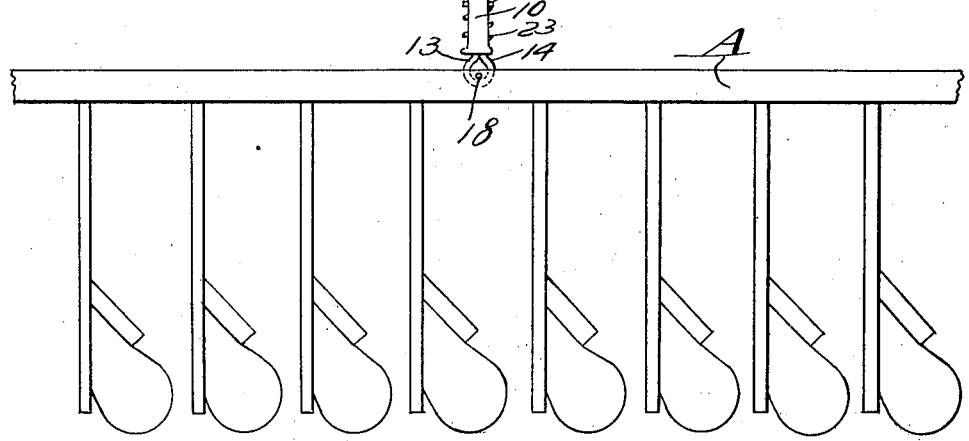
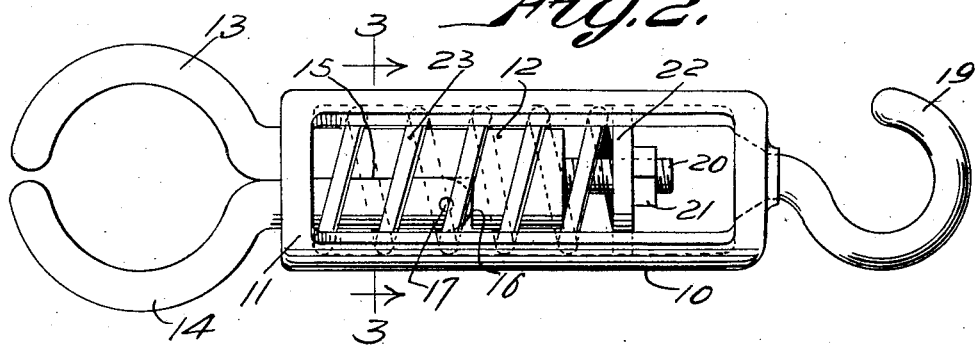
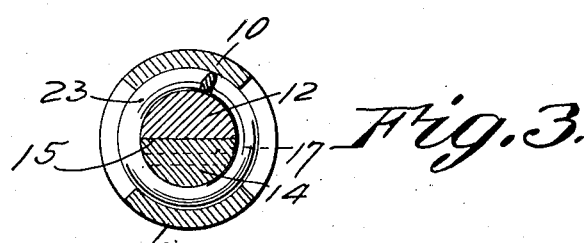
Inventor
Christian Bettger,
By Talbert & Parker
Attorneys

UNITED STATES PATENT OFFICE.

CHRISTIAN BETTGER, OF BREMEN, NORTH DAKOTA.

CLEVIS.

1,340,105.  Specification of Letters Patent.  Patented May 11, 1920.

Application filed April 30, 1917. Serial No. 165,510.

*To all whom it may concern:*

Be it known that I, CHRISTIAN BETTGER, a citizen of the United States, residing at Bremen, in the county of Wells and State of North Dakota, have invented certain useful Improvements in Clevises, of which the following is a specification, reference being had therein to the accompanying drawing.

The invention relates to a clevis, and more particularly to the class of automatically released clevises for use on agricultural implements or machinery such as single or gang plows, cultivators or the like.

The primary object of the invention is the provision of a clevis of this character wherein, should the implement or machinery in the working thereof strike or become caught in an obstruction in the path of its travel, the clevis will automatically open, thereby releasing the draft from the implement or machinery so as to avoid damage thereto.

Another object of the invention is the provision of a clevis of this character wherein the construction thereof is novel in form to relieve any excessive strain upon the draft such as an animal or motor tractor, and the implement or machinery when the latter is subjected to resistance in the execution of its work, and all undue shocks and jars are absorbed by the said clevis in the use thereof.

A further object of the invention is the provision of a clevis of this character which is simple in construction, readily and easily adjusted to vary the automatic action thereof, strong, durable, thoroughly reliable and efficient in its operation and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claim.

In the accompanying drawing:

Figure 1 is a fragmentary plan view, partly diagrammatically, of a gang plow and hitch of a motor tractor having the clevis constructed in accordance with the invention applied for connecting the same;

Fig. 2 is a side elevation of the clevis detached;

Fig. 3 is a sectional view on the line 3—3 of Fig. 2.

Similar reference characters indicate corresponding parts throughout the several views of the drawing.

Referring to the drawing in detail, A designates the gang beam for the gang plows which are attached thereto in any desirable or ordinary well known manner, while B is the hitch of a motor tractor for the draft of the gang plows in the tilling of the soil.

The hitch B is connected with the gang beam A by means of the automatic-release clevis which comprises a yoke loop member 10 which constitutes the frame body of the clevis and has formed in one closed end thereof a central guide opening 11 through which works the stem 12 of a draw pin releasing member which includes the stationary and movable jaws 13 and 14, respectively, the stem 12 being cut away at 15 to form a recess or seat for the arm 16 of the movable jaw 14, which arm is pivoted at 17 to the stem, it being apparent that the end of the yoke loop member 10 having the opening 11 rides on to the arm 16 of the movable jaw 14 to hold the same closed relative to the stationary jaw 13, and these jaws are adapted to engage about the draw pin 18 in the gang beam A for the fastening of the clevis thereto.

Swiveled or otherwise mounted in the opposite closed end of the yoke or loop member 10 is a hook 19 which is adapted for detachable engagement in the hitch B of the motor tractor and in this manner the clevis is engaged therewith.

The stem 12 is formed with a reduced threaded portion 20 on which is adjustably mounted a nut 21 and a washer 22, the nut being designed to work against the washer, while surrounding the stem 12 is a coiled compression spring 23, one end of which works against the washer, while its opposite end works against the yoke or loop member 10 at the end thereof having the opening 11 so that said yoke or loop member is normally held in position upon the stem 12 to lock the jaws 13 and 14 closed for the engagement of the clevis with the draw pin 18 in the gang beam A, and in this manner said clevis will connect the hitch of the motor tractor with the gang beam.

Now should the gang plow strike an obstruction or become blocked when working the soil the strain or resistance will be imparted to the clevis and by the action of the spring 23 the yoke will be moved on the stem 12, and when passing the pivotal point 17 of the arm 16 with the stem 12 the movable jaw 14 is free to open relative to the stationary jaw 13 of the clevis, and in this manner the latter is automatically released from the draw pin 18 in the gang beam A, thus freeing the tractor from the gang plow and thereby eliminating damage to the gang plow.

When the tractor is coupled with the gang plow in the use of the clevis, should undue strains exist in the working of the plow the springs 23 will absorb the strain and all shocks and jars will be relieved from both the plow and the tractor. On adjustment of the nut 21 on the reduced end portion 20 of the stem 13 of the clevis the tension of the spring can be varied according to the weight of the load thereby regulating the automatically releasing action of the clevis, as will be clearly apparent.

From the foregoing description, taken in connection with the accompanying drawing, the construction and operation of the herein described clevis will be readily apparent and, therefore, a more extended explanation has been omitted.

Having thus described my invention, I claim:

A clevis of the character described comprising a loop-like yoke formed with a guide opening in one end, a stem slidable through the opening and having a jaw, a movable jaw pivotally connected with the stem, the movable jaw having an arm which passes through the guide opening and is pivoted to the stem within the yoke, so that the latter may operate to hold the movable jaw normally closed relative to the stationary jaw, and a spring in surrounding relation to the stem and compressed between one end of the stem and one end of the yoke.

In testimony whereof I affix my signature.

CHRISTIAN BETTGER.